(12) United States Patent
Sheridan

(10) Patent No.: US 10,669,948 B2
(45) Date of Patent: Jun. 2, 2020

(54) GEARED TURBOFAN WITH NON-EPICYCLIC GEAR REDUCTION SYSTEM

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 70 days.

(21) Appl. No.: 15/396,870

(22) Filed: Jan. 3, 2017

(65) Prior Publication Data

US 2018/0291819 A1  Oct. 11, 2018

(51) Int. Cl.
| | | |
|---|---|---|
| *F02C 7/36* | (2006.01) | |
| *F02K 3/06* | (2006.01) | |
| *F02C 3/107* | (2006.01) | |
| *F16H 1/20* | (2006.01) | |
| *F16H 57/04* | (2010.01) | |

(52) U.S. Cl.
CPC .............. *F02C 7/36* (2013.01); *F02C 3/107* (2013.01); *F02K 3/06* (2013.01); *F16H 1/20* (2013.01); *F16H 57/0423* (2013.01); *F16H 57/0457* (2013.01); *F16H 57/0495* (2013.01); *F05D 2220/323* (2013.01); *F05D 2240/62* (2013.01); *F05D 2260/4031* (2013.01); *F05D 2260/40311* (2013.01); *F05D 2260/98* (2013.01)

(58) Field of Classification Search
CPC ...... F02C 7/36; F16H 1/02; F16H 1/20; F16H 1/206; F16H 57/0423; F16H 57/0457; F16H 57/0495; F16H 1/06; F05D 2220/323; F05D 2260/98; F05D 2240/62; F05D 2260/40; F05D 2260/4031; F05D 2260/53; F01D 15/12
See application file for complete search history.

(56) References Cited

U.S. PATENT DOCUMENTS

| | | | | |
|---|---|---|---|---|
| 2,501,633 | A | * | 3/1950 | Price ................ F02C 3/113 416/93 R |
| 4,590,820 | A | * | 5/1986 | Hambric ............ F16H 1/22 74/467 |
| 7,704,178 | B2 | | 4/2010 | Sheridan et al. |
| 8,572,943 | B1 | | 11/2013 | Sheridan |
| 8,756,908 | B2 | | 6/2014 | Sheridan et al. |

(Continued)

FOREIGN PATENT DOCUMENTS

| | | | | |
|---|---|---|---|---|
| EP | 2226487 | A2 | 9/2010 | |
| EP | 2975239 | A1 * | 1/2016 | .......... F02C 3/107 |

(Continued)

OTHER PUBLICATIONS

European Search Report for EP Application No. 18150209.7 dated May 11, 2018.

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

A gas turbine engine comprises a fan drive turbine driving a shaft. The shaft engages a gear reduction. The gear reduction drives a fan rotor at a speed that is less than the speed of the fan drive turbine. The gear reduction is a non-epicyclic gear reduction.

14 Claims, 3 Drawing Sheets

(56) References Cited

U.S. PATENT DOCUMENTS

| | | | | |
|---|---|---|---|---|
| 9,194,255 B2* | 11/2015 | Sheridan | ............ | F16H 57/0486 |
| 2007/0240399 A1* | 10/2007 | Orlando | .................... | F02C 7/36 |
| | | | | 60/39.162 |
| 2009/0111639 A1* | 4/2009 | Klingels | ................. | F01D 15/12 |
| | | | | 475/347 |
| 2010/0061839 A1* | 3/2010 | Bartolomeo | .............. | F02C 7/32 |
| | | | | 415/122.1 |
| 2012/0171018 A1* | 7/2012 | Hasel | ...................... | F02C 3/107 |
| | | | | 415/122.1 |
| 2013/0318999 A1* | 12/2013 | Lucas | .................... | F02C 3/067 |
| | | | | 60/792 |
| 2016/0186604 A1 | 6/2016 | Ertas | | |

FOREIGN PATENT DOCUMENTS

| | | | | | |
|---|---|---|---|---|---|
| EP | 2975239 | A1 | | 1/2016 | |
| EP | 2226487 | B1 * | 12/2018 | | ............. F02C 3/113 |
| GB | 190417234 | A * | 8/1905 | | |
| GB | 191268 | A * | 1/1923 | | ............. F16H 37/08 |
| GB | 612709 | | 11/1948 | | |
| GB | 612709 | A * | 11/1948 | | ............. F02C 6/206 |

\* cited by examiner

GEARED TURBOFAN WITH NON-EPICYCLIC GEAR REDUCTION SYSTEM

BACKGROUND OF THE INVENTION

This application relates to a geared gas turbine engine wherein a fan rotor is driven through a non-epicyclic gear reduction.

Gas turbine engines are known and typically include a fan delivering air into a bypass duct as propulsion air and further into an engine core including a compressor. The air is compressed and delivered into a combustor where it is mixed with fuel and ignited. Products of this combustion pass downstream over turbine rotors, driving them to rotate.

Historically, a fan drive turbine has driven the fan as a spool and at a single speed. More recently, a gear reduction has been placed between the fan and the fan drive turbine. This allows the fan to rotate at slower speeds, which has beneficial characteristics.

To date, the gear reduction utilized in geared gas turbine engines has been an epicyclic gear system.

SUMMARY OF THE INVENTION

In a featured embodiment, a gas turbine engine comprises a fan drive turbine driving a shaft, the shaft engaging a gear reduction, the gear reduction driving a fan rotor at a speed that is less than the speed of the fan drive turbine, and the gear reduction being a non-epicyclic gear reduction.

In another embodiment according to the previous embodiment, the fan drive turbine drives an input gear of the gear reduction through a flexible input shaft.

In another embodiment according to any of the previous embodiments, an output gear of the gear reduction drives the fan rotor through a flexible output shaft.

In another embodiment according to any of the previous embodiments, the gear reduction is rigidly mounted to a housing in the gas turbine engine.

In another embodiment according to any of the previous embodiments, the input gear drives an intermediate gear to, in turn, drive the output gear.

In another embodiment according to any of the previous embodiments, the intermediate gear has a first set of gear teeth engaging gear teeth on the input gear and a second set of gear teeth engaging gear teeth on the output gear.

In another embodiment according to any of the previous embodiments, there are a plurality of circumferentially spaced intermediate gears.

In another embodiment according to any of the previous embodiments, there are a plurality of oil baffles circumferentially spaced between the circumferentially spaced intermediate gears and for delivering a lubricant to the input gear.

In another embodiment according to any of the previous embodiments, the second set of gear teeth on the intermediate gears are positioned radially outwardly of the gear teeth on the output gear.

In another embodiment according to any of the previous embodiments, the input gear drives an intermediate gear to, in turn, drive an output gear.

In another embodiment according to any of the previous embodiments, the intermediate gear has a first set of gear teeth engaging gear teeth on the input gear and a second set of gear teeth engaging gear teeth on the output gear.

In another embodiment according to any of the previous embodiments, there are a plurality of circumferentially spaced intermediate gears.

In another embodiment according to any of the previous embodiments, there are a plurality of oil baffles circumferentially spaced between the circumferentially spaced intermediate gears and for delivering a lubricant to the input gear.

In another embodiment according to any of the previous embodiments, the second set of gear teeth on the intermediate gears are positioned radially outwardly of the gear teeth on the output gear.

In another embodiment according to any of the previous embodiments, an output gear of the gear reduction drives the fan rotor through a flexible output shaft.

In another embodiment according to any of the previous embodiments, the gear reduction is rigidly mounted to a housing in the gas turbine engine.

In another embodiment according to any of the previous embodiments, the fan drive turbine drives an input gear, the input gear driving an intermediate gear, the intermediate gear driving an output gear to drive the fan rotor.

In another embodiment according to any of the previous embodiments, the intermediate gear has a first set of gear teeth engaging gear teeth on the input gear and a second set of gear teeth engaging gear teeth on the output gear.

In another embodiment according to any of the previous embodiments, there are a plurality of circumferentially spaced intermediate gears.

In another embodiment according to any of the previous embodiments, the non-epicyclic gear reduction does not include a ring gear.

These and other features may be best understood from the following drawings and specification.

DETAILED DESCRIPTION

Figure 1:
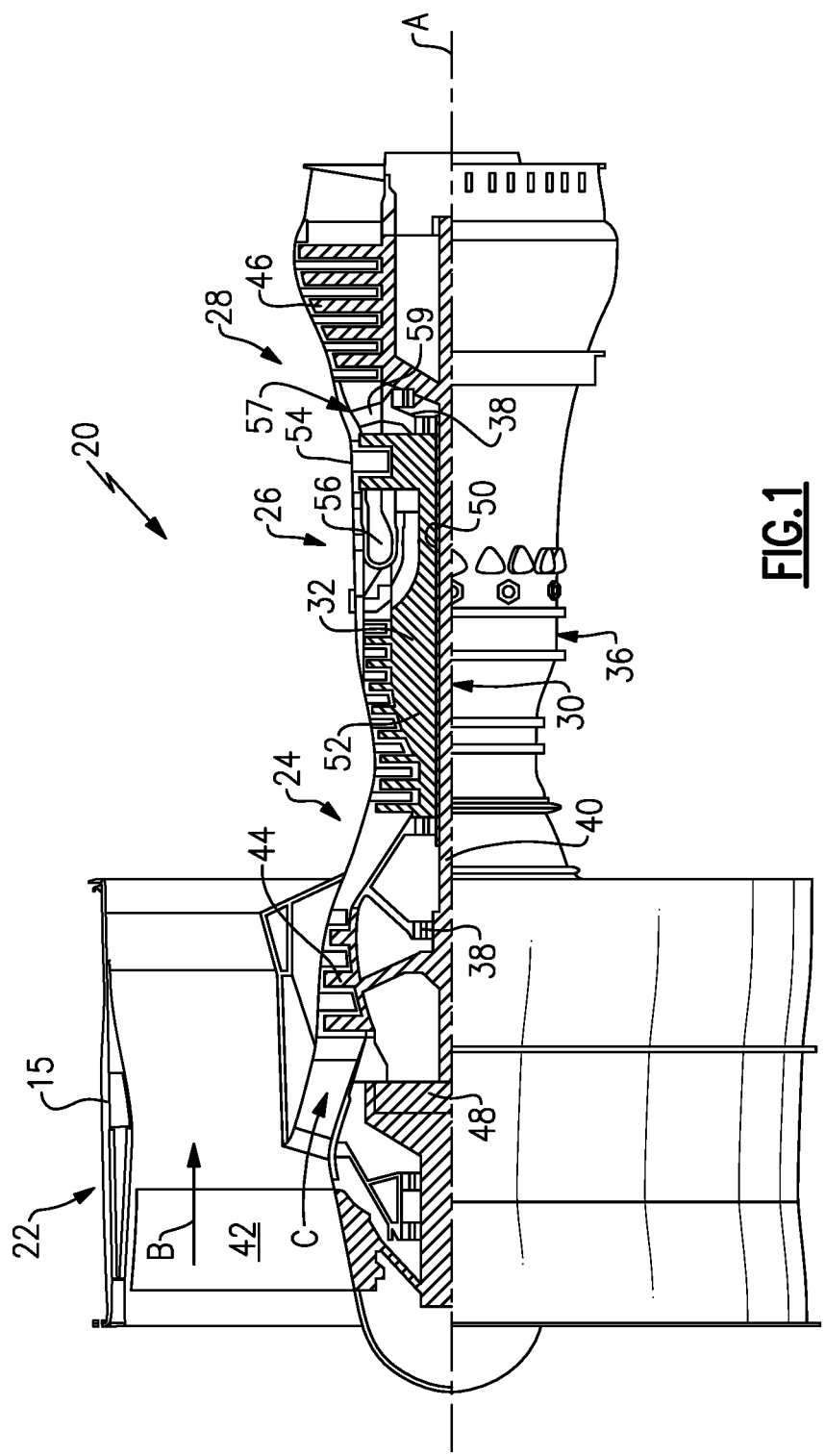
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10). In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
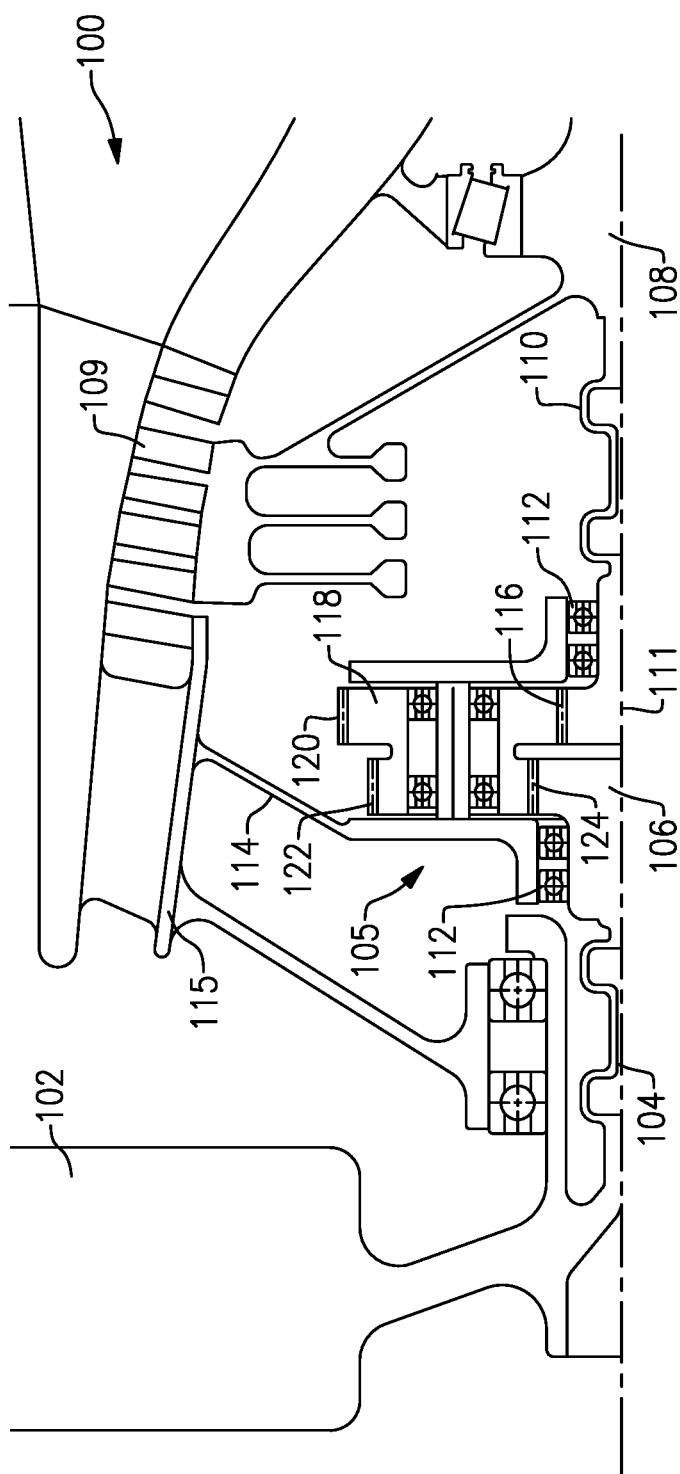
FIG. 2 is a detail of a gear reduction and fan drive system.

FIG. 2 shows an engine 100 having a fan rotor 102 driven by a flexible output shaft 104. An output gear 106 drives the flex shaft 104 to, in turn, drive the fan 102. A gear reduction 105 drives the output gear 106 at a slower speed than the input speed from a fan drive turbine drive shaft 108. The drive shaft 108 drives an input gear 111 through a flexible shaft 110. Bearings 112 mount the gears 106 and 111 within a rigid mount 114 to a housing 115. With an epicyclic gear system, the mount to the housing has typically been flexible. The gear reduction 105 allows the use of a rigid mount 114.

The input gear 111 has gear teeth 116 engaging gear teeth 120 on a plurality of intermediate gears 118. Gear teeth 122 on the intermediate gears 118 are spaced from gear teeth 120 and engage gear teeth 124 on the output gear 106 to drive the output gear 106.

Notably, the gear teeth 122 engage gear teeth 124 radially inward of the gear teeth 122.

Thus, the fan drive turbine and its shaft 108 can rotate at a higher speed than the fan rotor 102.

A low pressure compressor 109 is shown rotating at the same speed as shaft 108 and faster than the fan 102 due to the gear reduction 105.

Figure 3:
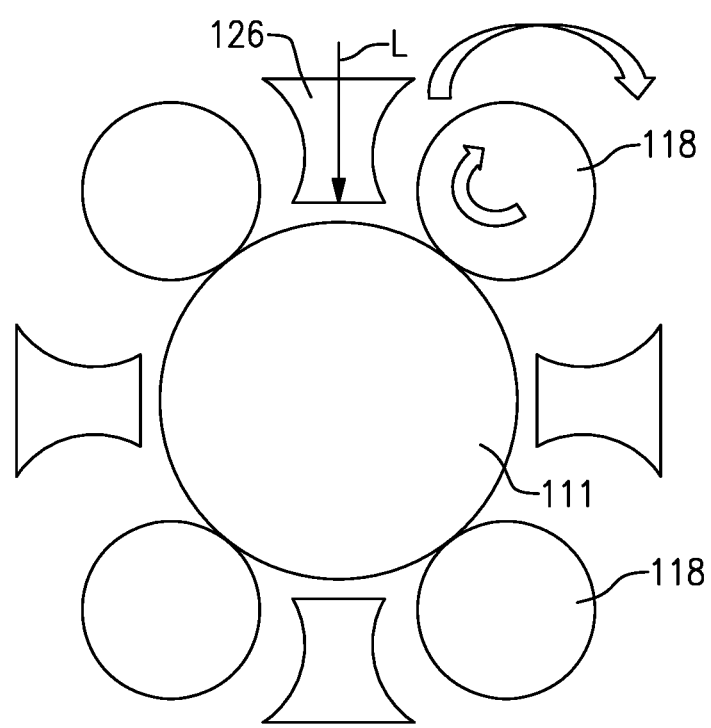
FIG. 3 shows a further detail of the gear reduction.

FIG. 3 shows further details wherein oil baffles 126 are circumferentially spaced with the intermediate gears 118 to deliver oil as needed by the gear reduction as shown at L. The use of the oil baffles 118 provides a high mechanical gear efficiency.

In one sense, the gas turbine engine 100 as disclosed includes a gear reduction 105 for driving a fan rotor 102 at a slower speed than a fan drive turbine, wherein the gear reduction is non-epicyclic. The term "non-epicyclic" could be taken to mean a gear reduction which does not include a ring gear.

A "non-epicyclic" gear reduction could also be defined as having at least two or more gears 111/118 as an example, which mesh through a set of gear teeth 120, which rotate about bearings 112 that are mounted in a housing 115 which is fixed in space such that none of the gears 111/118 can orbit about each other. In addition, none of the gears 111/118 in the non-epicyclic gear train are of an annular ring configuration with internal teeth, whereas an annular ring gear can circumscribe any of the two or more gears in the gear train while simultaneously meshing with the gear or gears it circumscribes. The embodiment of the invention described herein is a non-epicyclic configuration.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan drive turbine driving a shaft, said shaft engaging a gear reduction, said gear reduction driving a fan rotor at a speed that is less than the speed of the fan drive turbine;
    said gear reduction being a non-epicyclic gear reduction;
    wherein said non-epicyclic gear reduction does not include a ring gear; and
    said fan drive turbine driving a compressor at a same speed, said fan drive turbine driving an input gear, said input gear driving a plurality of circumferentially spaced intermediate gears to, in turn, drive an output gear.

2. The gas turbine engine as set forth in claim 1, wherein said fan drive turbine drives said input gear of said gear reduction through a flexible input shaft.

3. The gas turbine engine as set forth in claim 2, wherein said output gear of said gear reduction drives the fan rotor through a flexible output shaft.

4. The gas turbine engine as set forth in claim 3, wherein said gear reduction is rigidly mounted to a housing in said gas turbine engine.

5. The gas turbine engine as set forth in wherein said intermediate gears have a first set of gear teeth engaging gear teeth on said input gear and a second set of gear teeth engaging gear teeth on said output gear.

6. The gas turbine engine as set forth in claim 5, wherein there are a plurality of oil baffles circumferentially spaced between said circumferentially spaced intermediate gears for delivering a lubricant to said input gear.

7. The gas turbine engine as set forth in claim 6, wherein said second set of gear teeth on said intermediate gears are positioned radially outwardly of said gear teeth on said output gear.

8. The gas turbine engine as set forth in claim 7, wherein said intermediate gears have a first set of gear teeth engaging gear teeth on said input gear and a second set of gear teeth engaging gear teeth on said output gear.

9. The gas turbine engine as set forth in claim 1, wherein there are a plurality of oil baffles circumferentially spaced between said circumferentially spaced intermediate gears and for delivering a lubricant to said input gear.

10. The gas turbine engine as set forth in claim 9, wherein said second set of gear teeth on said intermediate gears are positioned radially outwardly of said gear teeth on said output gear.

11. The gas turbine engine as set forth in claim 1, wherein an output gear of said gear reduction drives the fan rotor through a flexible output shaft.

12. The gas turbine engine as set forth in claim 1, wherein said gear reduction is rigidly mounted to a housing in said gas turbine engine.

13. The gas turbine engine as set forth in claim 1, wherein said intermediate gears driving an output gear to drive said fan rotor.

14. The gas turbine engine as set forth in claim 13, wherein said intermediate gears have a first set of gear teeth engaging gear teeth on said input gear and a second set of gear teeth engaging gear teeth on said output gear.

* * * * *

UNITED STATES PATENT AND TRADEMARK OFFICE
CERTIFICATE OF CORRECTION

PATENT NO. : 10,669,948 B2  Page 1 of 1
APPLICATION NO. : 15/396870
DATED : June 2, 2020
INVENTOR(S) : William G. Sheridan It is certified that error appears in the above-identified patent and that said Letters Patent is hereby corrected as shown below:

In the Claims

In Claim 5, Column 5, Line 7; replace "as set forth in wherein" with --as set forth in claim 4 wherein--

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*